United States Patent Office

2,856,398
Patented Oct. 14, 1958

2,856,398
CARBOXYMETHYL DEXTRAN-IRON COMPLEXES

Leo J. Novak, Dayton, Ohio, assignor to The Commonwealth Engineering Company of Ohio, Dayton, Ohio, a corporation of Ohio No Drawing. Application June 15, 1956
Serial No. 591,540

6 Claims. (Cl. 260—209)

This invention relates to carboxyalkyl dextran-iron complexes. More particularly, the invention relates to carboxymethyl dextran-iron complexes.

The carboxyalkyl dextrans used in preparing the new iron complexes contain an average of from about 1.0 up to 3.0 carboxyalkyl groups per anhydroglucose unit.

The purpose of introducing the carboxyalkyl, specifically carboxymethyl, groups into the dextran molecule prior to forming the iron complex is not to impart water-solubility or water-dispersibility to the dextran since the dextran selected for use in preparing the ether is inherently soluble or at least dispersible in water.

The purpose of the carboxymethyl groups is to increase the bulk of the dextran molecule, to alter the characteristics of the dextran in water, more especially the effect thereof on the viscosity of water or aqueous media, and to increase the water pick-up and retention capacity of the dextran.

The ether must contain a sufficient number of carboxymethyl groups to modify the properties of the parent water-soluble or water-dispersible dextran. It is found that, for such purpose, the ether must contain an average of at least about 1.0 carboxymethyl group per anhydroglucose unit.

The conditions for the preparation of carboxymethyl dextrans having the required minimum degree of substitution with respect to the carboxymethyl groups are critical.

It is found that the ethers cannot be obtained by first treating dextran with an alkali metal alcoholate, in non-aqueous alcoholic medium, and then treating the alkali-substituted dextran with a carboxyalkylating agent.

When dextran is treated with an alkali metal alcoholate such as sodium methylate, in alcohol, such as methanol, in accordance with methods that have been applied to cellulose and starch, the resulting dextran product is found to contain only traces of sodium. Treatment of that product with a carboxyalkylating agent such as chloracetic acid results in a product containing only a very small number of carboxymethyl groups. In fact, the maximum degree of substitution obtainable under those conditions has been established as an average of only 0.2–0.3 carboxymethyl group per anhydroglucose unit. The characteristics of those products are not distinguishable from the characteristics of the parent dextran. For instance, the low-substituted ethers derived from the intermediate low-substituted sodium or other alkali metal dextrans prepared by treating dextran with the alkali metal alcoholate in alcohol do not increase the viscosity of water or aqueous media even in relatively high concentrations. That can be determined by means of the Brookfield viscometer.

In contrast, the carboxymethyl dextrans having an average minimum degree of substitution of about 1.0 carboxymethyl group per anhydroglucose unit increase the viscosity of water and aqueous media very markedly and even form gels in water at the very low concentration of 0.5% by weight. This capacity to increase the viscosity of water and aqueous media, and to form gels, has a direct influence on the effectiveness of the iron complexes for various purposes.

The carboxyalkyl dextrans in which the alkyl group contains from 1 to 4 carbon atoms and having minimum average D. S. of about 1.0 carboxyalkyl group per AGU, can be obtained by the method disclosed in the pending application of L. J. Novak et al., Serial No. 638,889 filed December 3, 1956, which is a continuation-in-part of application Ser. No. 346,016, filed March 31, 1953, now abandoned.

Carboxymethyl dextran, for instance, having the required minimum D. S. can be obtained by treating inherently water-soluble or water-dispersible dextran with an excess of sodium or potassium chloracetate in solution or suspension in aqueous sodium or potassium hydroxide at a temperature between 50° C. and 100° C. for from one-half hour to two hours.

The molar ratio of sodium or potassium chloracetate used is between 2:1 and 12:1. The molar ratio of sodium or potassium hydroxide to dextran used is between 1:1 and 15:1. The molar ratio of water to dextran used is between 20:1 and 120:1.

The initial product of the reaction is the sodium or potassium salt of the carboxymethyl dextran. It may be precipitated from the viscous reaction mass by a non-solvent therefor. The precipitant may be a water-miscible alcohol such as methyl, ethyl, propyl, isopropyl or t-butyl alcohol, or a water-miscible ketone such as acetone. The precipitated salt may be separated from the alcohol-water phase by filtration.

The free carboxymethyl dextran may be recovered from the salt by mixing the salt with water, acidifying to pH 3.0, and precipitating the ether by means of acetone or the water-miscible alcohol.

The following is a detailed procedure that has been used to prepare a carboxymethyl dextran suitable for use in forming the present iron complexes, the parts being by weight unless otherwise specified.

About 100 parts of native NRRL L. m. B–512 dextran were dissolved in 700 parts of water. In a separate vessel, 150 parts of sodium hydroxide were dissolved in 150 parts of water and the solution was added to the dextran solution to obtain solution A.

Separately, 220 parts of monochloracetic acid were dissolved in 400 parts of water and 112.3 parts of sodium carbonate were added slowly to the solution, to obtain solution B.

Solutions A and B were then mixed together with continued agitation and the mass was held at 65° C. for one hour. It was then adjusted to pH 3.0 by the addition thereto of hydrochloric acid.

The acidified solution was poured slowly into 1500 parts by volume of methanol to precipitate the carboxymethyl dextran. The precipitated ether was redissolved in 2000 parts by volume of water and reprecipitated by pouring into 2000 parts by volume of methanol.

The precipitated pasty mass was passed through pressure squeeze rolls into 300 parts by volume of methanol and allowed to stand in the methanol for two hours. It was then repassed through the pressure rolls, dried under vacuum, and ground to fine particle size.

The carboxymethyl dextran thus produced contained, on analysis, an average of about 1.0 carboxymethyl group per anhydroglucose unit.

More highly substituted ethers containing an average of up to 3.0 carboxymethyl groups per anhydroglucose unit are obtained by adjustment of the reaction conditions and particularly by correlation of the temperature and reaction time within the limits stated.

Other carboxyalkyl dextrans in which the alkyl group contains up to 4 carbons are prepared in the same manner except that the sodium or potassium chloracetate is replaced by the appropriate reagent.

The dextran used in the procedure described was native, unhydrolyzed dextran classified as *Leuconostoc mesenteroides* B–512 according to the classification system of the Northern Regional Research Laboratory, i. e. native unhydrolyzed NRRL B–512 dextran. Other inherently water-soluble or water-dispersible NRRL dextrans may be used. As is known, the characteristics of dextrans, including the proportion of anhydroglucose units joined by 1,6 linkages, depend on the microorganism which is cultivated to produce the enzyme dextransucrase which acts on sucrose to convert it to dextran. The dextrans useful for the present purposes are generally characterized by a high 1,6 to non-1,6 linkages ratio, usually at least 86:1, and in the range 86:1 to 97:1. This includes the dextrans produced by the following NRRL strains: *Leuconostoc mesenteroides* B–1146, –1064, –1397, –641, –1066, –1382, –1383, –1308, –1255 and so on.

The native dextran as produced from sucrose by fermentation normally has a very high molecular weight estimated in the millions. It may be carboxyalkylated in the native, high molecular weight condition, or after hydrolysis to a lower molecular weight. The dextran may have a molecular weight between 2000 and that of the native, unhydrolyzed dextran.

The ferrous carboxymethyl dextran complexes of the invention are soluble in aqueous acid solution. Thus, in hydrochloric acid solution having a pH of 1.05, the ferrous carboxymethyl dextrans tend to dissolve slowly, the solution becoming progressively more yellow. In acidic solutions consisting of equal volumes of water and concentrated hydrochloric acid, or of three volumes of water to one of concentrated hydrochlor acid, the ferrous carboxymethyl dextrans dissolve rapidly yielding a greenish-yellow solution.

The ferrous complexes dissolve in aqueous solutions of other strong acids, also.

The ferric carboxymethyl dextran complexes differ from the ferrous complexes in respect to solubility. Thus, the ferric complexes are swollen strongly in hydrochloric acid at pH 1.05, are insoluble at pH 1.5 to 5.5, and only very slowly soluble in media consisting of equal parts of water and concentrated hydrochloric acid. Dissolution is also very slow in media consisting of three volumes of water to one of hydrochloric acid.

At pH between 1.5 and 5.5, carboxymethyl dextran gives a precipitate of the corresponding iron complex when a soluble ferric salt is present with the carboxymethyl dextran. In that case, it is only necessary to filter the precipitate from the aqueous system, wash it with either water or alcohol, and dry it. This proves the formation of a ferric carboxymethyl dextran complex having maximum insolubility in water at pH 1.5 to 5.5. However the ferric carboxymethyl dextran complexes are swellable and ultimately soluble in aqueous alkaline solution.

The new iron complexes are obtained by adding an aqueous solution of a suitable water-soluble iron salt to an aqueous solution of the carboxyalkyl dextran, and adjusting the pH of the mixture to a value at which the iron complex formed is stable and can be isolated by adding to the reaction mass a water-miscible non-solvent for the complex, followed by filtration.

Both the ferrous and ferric complexes may be precipitated from the reaction mass at alkaline pH by adding alcohol or other suitable water-miscible organic non-polar solvent to the reaction mass, even though the ferric complexes dissolve in aqueous alkaline solution at pH 7.0 or higher.

If an aqueous solution of a ferrous salt such as ferrous ammonium sulfate or ferrous chloride is added to an aqueous solution of the carboxyalkyl dextran, the resulting mass is strongly acid and the ferrous-carboxyalkyl dextran formed remains in solution. If it precipitates to any extent, it is redissolved in the aqueous acid medium.

In general, the complex can be recovered from the reaction mass by adjusting the pH of the mass to a value on the acid side but near the neutral point or to a value on the alkaline side, e. g., to a value between 6.2 and 10.2 by the addition of aqueous alkali such as an aqueous sodium hydroxide solution.

The stable precipitate is brought down by the addition of the water-miscible non-solvent, such as isopropanol, filtered off, preferably under vacuum, and dried.

Use of an organic, non-polar water-miscible precipitant like isopropanol has the advantage that the iron-carboxyalkyl dextran is dehydrated simultaneously, excess water and acid or alkali being removed. The final drying is thereby facilitated.

When a ferric salt is used, such as ferric chloride, the aqueous solution thereof is added to an aqueous alkaline solution of the carboxymethyl dextran. For instance, solution of the ferric salt solution is added to an aqueous solution of the sodium salt of the ether. Addition of the ferric salt plus hydrochloric acid if needed results in a lowering of the pH far to the acid side, i. e., to a value, such as about 1.0, at which the ferric complex may remain in solution. The addition of aqueous sodium hydroxide to the solution to raise the pH to a somewhat higher value on the acid side, usually to 1.3–1.4, generally results in a heavy precipitate of the ferric complex. The complex may be separated at that pH by precipitation with alcohol and filtration. Or the pH of the system may be increased to a pH above 7.0 to obtain a soluble iron carboxyalkyl dextran which can be precipitated with alcohol or other suitable organic water-miscible non-polar solvent.

The ferrous and ferric carboxyalkyl dextran complexes occur as red-brown or tan powdered or granular materials soluble, respectively, in aqueous acid and alkaline media.

Any water-soluble ferrous or ferric salt may be added to the aqueous solution of carboxyalkyl dextran to produce the complex. The reaction usually occurs at room temperature but elevated temperatures of 50° C. to 90° C. may be used.

Aqueous solutions or dispersions of the carboxyalkyl dextran of 5–15% concentration are suitable. Aqueous solutions of the ferrous or ferric salt of the same concentration may be used.

The following examples are given to illustrate specific embodiments of the invention, it being understood that these examples are not intended as limitative. Parts are by weight unless otherwise specified.

EXAMPLE I

About 14.8 parts of sodium carboxymethyl dextran (derived from *L. m.* B–512 dextran of molecular weight about 100,000 and having an average D. S. of about 1.0) were dissolved in 400 parts by volume of distilled water. About 7.0 parts of ferrous chloride ($FeCl_2.4H_2O$) were dissolved in 100 parts by volume of distilled water and the solution was added to the sodium carboxymethyl dextran solution. The pH of the mixture was 6.4. No precipitate formed at that pH. Concentrated hydrochloric acid was added until the pH of the solution was 1.2 and the solution was yellow in color. A 10% aqueous sodium hydroxide solution was added until the pH reached 6.2. At that pH, the solution had a yellow-orange color. About 500 parts by volume of isopropanol were added to precipitate the iron-carboxymethyl dextran complex.

The supernatant was poured off, and the precipitate was mixed with 500 parts by volume of distilled water. About 500 parts by volume of isopropanol were added to reprecipitate the iron-carboxymethyl dextran complex. The precipitate was suction-filtered and dried under reduced pressure at about 70° C. for four hours. It was further dried in air for 24 hours. The complex (yield 10.7 parts) was chocolate brown in color.

EXAMPLE II

About 16.3 parts of sodium carboxymethyl dextran as in Example I were dissolved in 400 parts by volume of distilled water. The pH of the solution was 9.9. Hydrochloric acid was added until a pH of 1.9 was attained.

A solution of 7 parts ferric chloride ($FeCl_3 \cdot 6H_2O$) in 100 parts by volume of water was added to a pH of 1.5. At this pH, there was no precipitation of an iron-carboxymethyl dextran complex. The solution had a clear orange color. A 10% aqueous sodium hydroxide solution was added. A precipitate began to form with the addition of the first few drops of the alkaline solution. The addition of the alkaline solution was continued until the pH reached 1.9 and there was a very heavy precipitate. When enough alkaline solution had been added to raise the pH to 4.7, 500 parts by volume of isopropanol were added to bring down the iron-carboxymethyl dextran complex. The supernatant was poured off. The precipitated complex was added to 500 parts by volume of distilled water, with stirring. Then 800 parts by volume of isopropanol were added to reprecipitate the iron complex. The complex was suction-filtered and air-dried for 24 hours. It was chocolate brown in color. Yield, 15 parts.

EXAMPLE III

A solution of sodium carboxymethyl dextran as in Example I was prepared by dissolving 48.9 parts of the sodium salt in 400 parts by volume of water. The pH of the solution was 10.05. Hydrochloric acid was added to pH 1.5, at which pH there was added a solution of 21 parts of ferric chloride in 100 parts by volume of water. There was no precipitate, the solution retained its initial reddish-amber color. The pH of the solution was 1.1.

Aqueous 10% sodium hydroxide solution was added. A precipitate began to form with the addition of the first few drops of the alkaline solution. When the pH reached 1.35, a very heavy precipitate had formed. At pH 5.3, the solution had become fluid again, indicating that some of the precipitate had re-dissolved, although a portion of the precipitate remained undissolved. On the addition of 10% aqueous sodium hydroxide to pH 11.3, the re-solution appeared to be complete.

The ferric-carboxymethyl dextran complex was precipitated by the addition of 500 parts by volume of isopropanol. The supernatant was poured off and the dark chocolate brown precipitate, which was tacky, agglomerated and gummy was dissolved in water and again precipitated by the addition of isopropanol. The supernatant was turbid and alkaline. It was poured off and the precipitate was filtered, redissolved in water, and the viscous solution was made fluid by the addition of water. The complex was precipitated for the third time by pouring the fluid solution into isopropanol.

EXAMPLE IV

About 48.9 parts of sodium carboxymethyl dextran were dissolved in 400 parts by volume of water. The pH of the solution was 10.1. Hydrochloric acid was added to pH 1.6.

A solution of 17.1 parts of ferric chloride ($FeCl_3 \cdot 6H_2O$) in 100 parts by volume of water was added. The resulting solution, of reddish-amber tint, had a pH of 1.25. Concentrated (10%) sodium hydroxide solution was added to bring the pH to 11.5. With the addition of the first drops of the alkali solution, a light-colored precipitate began to form. It was thick and heavy through pH 2.0 to 3.0, but redissolved slowly. Solution appeared to be complete within 30 minutes after termination of the sodium hydroxide solution addition. At that stage, the solution had a deep, dark chocolate-brown color. It was filtered slowly, with aid of suction. A small quantity of insoluble material was filtered off. The filtrate was poured into isopropanol with vigorous stirring. The precipitate was again filtered off, sucked dry in a Büchner funnel, then redissolved in about 500 parts by volume of water. The resulting solution was poured into an equal volume of isopropanol to reprecipitate the iron compound. The precipitate was sucked dry on a suction filter. It was granular and cholocate brown in color. It was again dissolved in about 500 parts by volume of water. The solution was extremely viscous. It was made fluid by heating to 70° C. for an hour, then cooled and poured into isopropanol. The precipitated iron complex was filtered with suction, redissolved, and reprecipitated several times. The final precipitate was dried under vacuum to obtain a granular, light brown material in a yield of 7.7 parts.

EXAMPLE V

About 48.0 parts of sodium carboxymethyl dextran prepared as in Example IV were dissolved in 400 parts by volume of water. The pH of the solution was 10.1. It was adjusted to 1.5 by addition of concentrated hydrochloric acid. A solution of 17.1 parts of ferric chloride ($FeCl_3 \cdot 6H_2O$) in 100 parts by volume of water was added. The mixture, of reddish amber tint, had a pH of 1.15. A small amount of precipitate had formed. Sufficient concentrated hydrochloric acid was added to redissolve it. The solution had a pH of 0.90 and a clear yellow color. Concentrated (10%) aqueous sodium hydroxide solution was added in small increments with stirring to pH 11.55. The solution had, at that pH, a deep chocolate brown color. On the addition of the first few drops of the alkaline solution a precipitate began to form and increased rapidly in quantity as the addition continued. The precipitate then redissolved. At pH 11.55, the solution was heated in an electric mantle for about an hour to redissolve the last traces of the precipitate. After standing overnight at room temperature, there remained a small undissolved residue. The solution was poured into an excess of isopropanol to precipitate the ferric-carboxymethyl dextran complex. The precipitate was black, tacky, and spongy.

The supernatant was poured off and the black precipitate was further dried in a Büchner funnel. It was redissolved in about 600 parts by volume of distilled water and again precipitated by pouring the solution into an excess of isopropanol with vigorous stirring. A fine, granular precipitate, chocolate brown in color, formed. The supernatant was filtered off and dried for 59 hours at a vacuum of 26.5 inches Hg. Yield, 40.4 parts.

EXAMPLE VI

The foregoing examples were repeated using carboxymethyl dextran having D. S. between 1.0 and 3.0 (1.5; 2.0; 2.5 and about 3.0) and derived from the following dextrans, both native and hydrolyzed dextrans having lower molecular weight (5000; 20–100,000; 500,000) being used:

L. m. B–1146
L. m. B–1064
L. m. B–1412

The results were similar to those shown in the other examples.

The iron content of the complexes varies, and may be from 2.0% up to as high as 25%. The ferric complexes precipitated from acid solution as described in the examples were found, on analysis, to have, usually, an iron content between 2.0% and 4.0%, more specifically, between 2.5% and 3.65%. The ferric complexes precipitated from alkaline solution analyzed, usually, between 6.5% and 7.3% iron. The ferrous complexes, which were precipitated from alkaline solution were found to contain, usually, from 5.5% to 7.5% iron.

In water, at a pH of 1.0 or lower, all of the iron of these ferric complexes is released to solution, most of the carboxymethyl dextran remaining undissolved as a colorless solid. In the vicinity of pH 4.0 almost all of the iron remains bound to the undissolved (dull red) solid carboxymethyl dextran. As the pH rises above 6.0, more of the iron goes into solution along with an apparently proportionate amount of carboxymethyl dextran. The deep red color of the solution indicates that the iron in solution is probably still complexed with the carboxymethyl dextran. At pH 8.0 one type of the iron-carboxymethyl dextran complex was found to be 90% in solution, while at the same pH, the other type of complex was found to be only 15% in solution.

The results of tests of iron-carboxymethyl dextran complexes in which the CMD had an average D. S. of 1.0 with respect to carboxymethyl groups for solubility in water are tabulated below. In these solubility studies, 1.0 gm. of the solid complex was equilibrated with 100 ml. of solution and the equilibrium pH value was determined.

*Ferrous carboxymethyl dextran*
*Iron=7%*

| pH: | Iron in solution (Percent of total) |
|---|---|
| 0.97 | 10.3 |
| 1.70 | 29.7 |
| 2.54 | 4.9 |
| 4.71 | 3.8 |
| 7.08 | 84.8 |
| 7.86 | 94.8 |

*Ferric carboxymethyl dextran*
*Iron=12%*

| pH: | Iron in solution (Percent of total) |
|---|---|
| 1.00 | 10.1 |
| 1.82 | 41.2 |
| 2.66 | 13.0 |
| 4.01 | 0.95 |
| 7.85 | 13.5 |

The complexes retain iron at lower pH values than would be expected. At the higher pH values, the iron goes into solution but as a complex with the carboxymethyl dextran. The degree of dissociation of such complex appears to be very low.

Other complexes of carboxymethyl dextran and iron, prepared as described, contained up to 20 to 30% of iron. However, at these high iron contents, the complexing efficiency of the carboxymethyl dextrans containing an average of about 1.0 carboxymethyl group per AGU decreases somewhat so that the complexes are only slowly soluble at pH above 7.0. With increase in the degree of substitution, the complexing efficiency of the carboxymethyl dextran for iron increased so that the complexes of iron content as high as 20–30%, with the ethers containing an average of more than 1.0 and up to 3.0 carboxymethyl groups per AGU are increasingly more readily soluble at pH values above 7.0.

The complexes are useful for various purposes when it is desired to liberate iron, for example, in soil conditioning and in blueprint photography.

Various changes and modifications may be made in details in practicing the invention, and since such variations may be made without departing from the spirit and scope of the invention, it is not intended to limit the invention except as defined in the appended claims.

What is claimed is:

1. A method for making carboxyalkyl dextran-iron complexes which are acid-soluble and alkali-precipitable, comprising adding an aqueous solution of a water-soluble iron salt to an aqueous solution of a carboxyalkyl ether of inherently water-dispersible dextran containing, per anhydroglucose unit, an average of about 1.0 to 3.0 carboxyalkyl groups the alkyl portion of which contains from one to four carbon atoms, holding the mixture at acid pH until the complex is formed, adding aqueous alkali to the mass until the pH thereof is raised to a value at which the complex formed is stable and does not tend to re-dissolve in the fluid reaction mass, and then precipitating the complex from the fluid reaction mass by adding to the latter a water-miscible, non-polar solvent precipitant for the complex, and separating the complex.

2. A method for making a carboxymethyl dextran-ferrous iron complex which is acid-soluble and alkali-precipitable, comprising adding an aqueous solution of ferrous chloride to an aqueous alkaline solution of a carboxymethyl ether of inherently water-dispersible dextran containing, per anhydroglucose unit, an average of about 1.0 to 3.0 carboxymethyl groups to obtain a fluid reaction mass, adding aqueous acid solution to the mass to adjust the pH thereof to a value at which the ferrous complex forms, then adding aqueous alkali to the mass until the pH thereof raised to a value at which the complex is stable and does not tend to re-dissolve in the fluid reaction mass, and precipitating the complex from the fluid mass by adding to the latter a water-miscible, organic, non-polar solvent precipitant for the complex, and separating the ferrous complex.

3. A method for making a carboxymethyl dextran-ferric iron complex which is acid-soluble and alkali-precipitable, comprising adding an aqueous solution of ferric chloride to an aqueous acid solution of a carboxymethyl ether of inherently water-dispersible dextran containing, per anhydroglucose unit, an average of about 1.0 to 3.0 carboxymethyl groups to obtain fluid reaction mass, holding the mass at acid pH until the complex is formed, adding aqueous alkali to the mass until the pH thereof is raised to a value at which the complex is stable, and precipitating the complex from the fluid reaction mass by adding to the mass a water-miscible, organic, non-polar solvent for the complex, and separating the complex.

4. A method for making carboxymethyl dextran-iron complexes which is acid-soluble and alkali-precipitable, comprising adding an aqueous solution of a water-soluble iron salt to an aqueous solution of a carboxymethyl ether of inherently water-dispersible dextran containing, per anhydroglucose unit, an average of about 1.0 carboxymethyl group, to obtain a fluid reaction mass holding the mass at acid pH until the complex is formed, then adding aqueous alkali to the mass until the pH thereof is raised to a value at which the complex is stable, and precipitating the complex from the fluid reaction mass by adding to the mass a water-miscible, organic, non-polar solvent precipitant for the complex, and separating the complex.

5. A method for making a carboxymethyl dextran-ferrous iron complex which is acid-soluble and alkali-precipitable, comprising adding an aqueous solution of ferrous chloride to an aqueous alkaline solution of a carboxymethyl ether of inherently water-dispersible dextran containing an average of about 1.0 carboxymethyl group per anhydroglucose unit to obtain a fluid reaction mass, adding aqueous acid to the mass to a pH at which the ferrous complex is formed, then adding aqueous alkali to the mass until the pH thereof is raised to a value at which the complex is stable, and precipitating the complex from the fluid reaction mass by adding to the mass a water-miscible, organic, non-polar solvent precipitant for the complex, and separating the complex.

6. A method for making a carboxymethyl dextran-ferric iron complex which is acid-soluble and alkali-precipitable, comprising adding an aqueous solution of ferric chloride to an aqueous acidic solution of a carboxymethyl ether of inherently water-dispersible dextran containing an average of about 1.0 carboxymethyl group per anhydroglucose unit, to obtain a fluid reaction mass, holding the mass at acid pH until the complex is formed, then adding aqueous alkali to the mass until the pH thereof is raised to a value at which the complex is stable, and precipitating the complex from the fluid reaction mass by adding to the mass a water-miscible, organic, non-polar solvent precipitant for the complex, and separating the complex.

References Cited in the file of this patent

UNITED STATES PATENTS

| | | |
|---|---|---|
| 2,539,417 | Grassie | Jan. 30, 1951 |
| 2,599,620 | Filbert | June 10, 1952 |
| 2,599,771 | Moe | June 10, 1952 |
| 2,609,368 | Gaver | Sept. 2, 1952 |
| 2,618,633 | Vaughan | Nov. 18, 1952 |
| 2,644,815 | Groswall | July 7, 1953 |
| 2,671,779 | Gaver et al. | Mar. 9, 1954 |